United States Patent [19]

Dettmer

[11] 4,182,605
[45] Jan. 8, 1980

[54] DIE FACE CUTTER

[75] Inventor: Edward V. Dettmer, Bay City, Mich.

[73] Assignee: The Dow Chemical Company, Midland, Mich.

[21] Appl. No.: 896,647

[22] Filed: Apr. 17, 1978

[51] Int. Cl.² ............................................. B29C 17/16
[52] U.S. Cl. .................... 425/311; 264/142; 425/379 R; 425/464; 425/DIG. 230
[58] Field of Search ............ 425/308, 313, 314, 379 R, 425/382 R, 464, DIG. 230, 311; 264/142, 143

[56] References Cited

U.S. PATENT DOCUMENTS

| 3,029,466 | 4/1962 | Guill | 425/313 |
| 3,349,433 | 10/1967 | Schippers et al. | 425/313 X |
| 3,427,685 | 2/1969 | Gove et al. | 425/314 X |
| 3,586,517 | 6/1971 | La Warre et al. | 425/464 X |
| 3,599,285 | 8/1971 | Hamilton | 425/313 X |
| 3,599,286 | 8/1971 | Karet | 425/464 |
| 3,605,187 | 9/1971 | Wurster et al. | 264/142 X |
| 3,749,536 | 7/1973 | Remscheid et al. | 425/464 X |
| 3,749,539 | 7/1973 | Galbreath et al. | 425/464 X |
| 3,792,950 | 2/1974 | Cuff | 425/313 |
| 3,867,082 | 2/1975 | Lambertus | 425/313 |
| 3,961,000 | 6/1976 | Ropiequet | 264/142 X |
| 4,021,176 | 5/1977 | Dettmer et al. | 264/142 X |
| 4,123,207 | 10/1978 | Dudley | 425/379 R X |

FOREIGN PATENT DOCUMENTS 2512899  3/1975  Fed. Rep. of Germany ............ 425/313

Primary Examiner—Philip Anderson
Attorney, Agent, or Firm—R. B. Ingraham

[57] ABSTRACT

An improved flat-faced die face cutter is provided which permits flushing of the face with water with minimal chilling of the die. A spindle is provided which minimizes thermal effects on knife die face-positioning.

7 Claims, 5 Drawing Figures

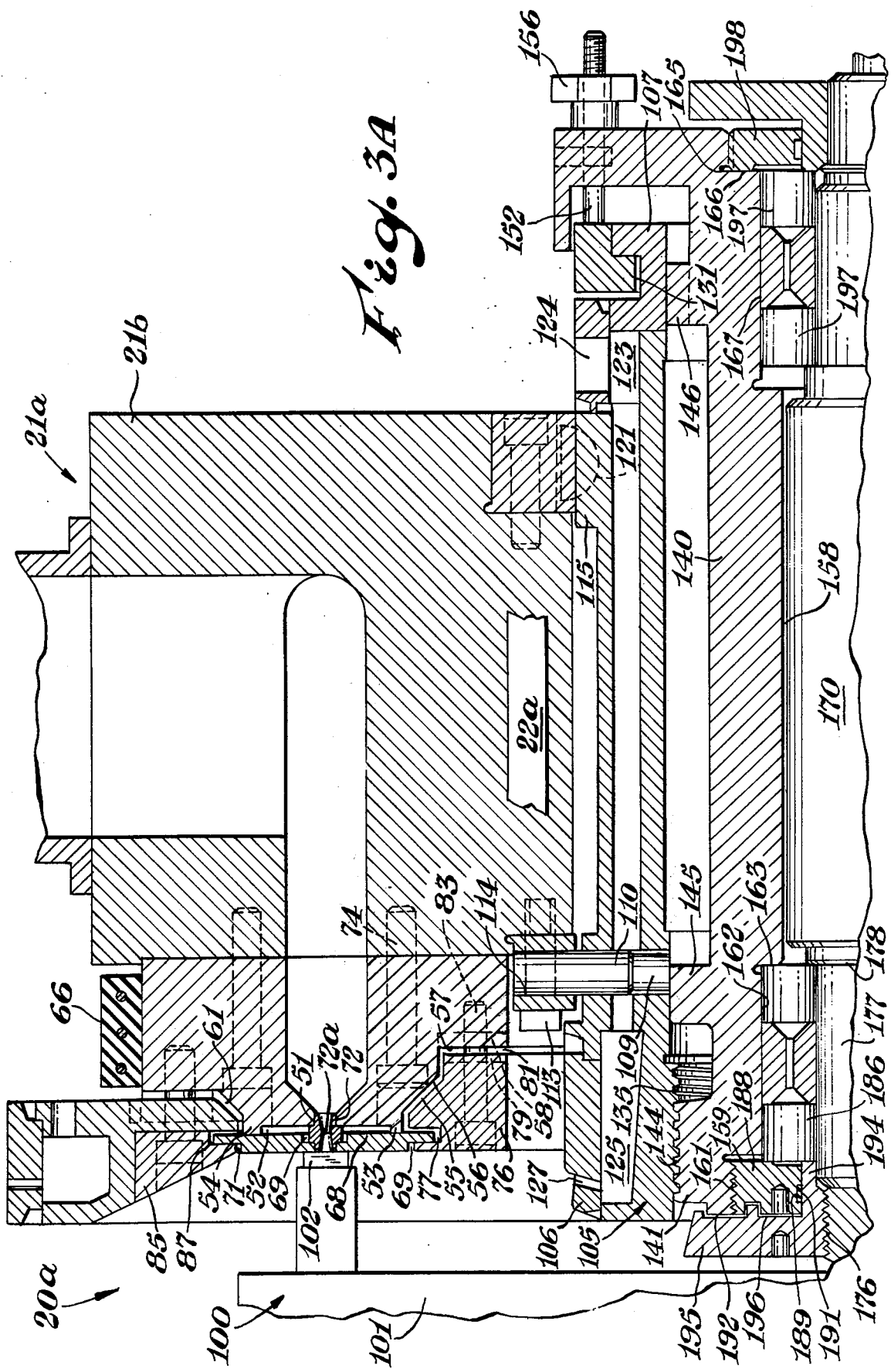

DIE FACE CUTTER

The pelleting of synthetic resinous thermoplastics has been a longstanding problem and a large variety of ingenious devices have been devised to prepare pellets. One of the simpler and easier to construct varieties of pelletizing equipment is the flat-faced die face cutter. By the term "flat-faced" is meant that the extrusion orifices terminate in the same plane whereby a knife may be rotated to shear any extrude issuing from the extrusion orifices. With certain polymers, such as polystyrene, there is a strong tendency for the polymer to smear and adhere to the die face when being cut. In order to minimize such smearing action, it is desirable to maintain the strand at as low a temperature as possible and yet maintain the temperature of the polymer melt being extruded as at high a temperature as possible, a situation that calls for rapid cooling of the extruded polymer and a requirement to insulate the extrusion die to prevent undue cooling thereof. In such a die face cutter, it is generally necessary to maintain a precise end clearance or operating pressure of the knife against the die face which generally is somewhat difficult as the working clearance is generally set when the apparatus is cold. As the die face cutter is put into service, a temperature change and often the spacing of the knife from the die face or the pressure on the die face by the knife is altered. Elaborate devices have been constructed to automatically control such spacing or pressure.

It would be desirable if there were available an improved die face cutter for the pelleting of plastics.

It would also be desirable if there were available an improved die face cutter in which cooling fluid could be directed against the die face without undue heat loss.

It would also be desirable if there were available an improved die face cutter which minimized thermal effects from the spacing of the knife from the die face.

These benefits and other advantages are achieved in a die face cutter assembly, the die face cutter assembly comprising in cooperative combination a generally annular extrusion die having an extrusion face of generally annular planar configuration, the die having a die body and a generally annular plenum therein having an axis of generation, the die body defining an entrance passageway, the entrance passageway being in communication with the plenum, the die body defining a plurality of extrusion passages in communication with the plenum, the extrusion passages extending generally perpendicular to the die face and each passage having a nozzle protruding therefrom, the nozzles each defining an extrusion nozzle passage therein in communication with the extrusion passages the nozzles being generally circularly arranged, a cutting plate having generally annular configuration and at least one generally planar cutting face, the cutting plate defining a plurality of passages therethrough, the passages each corresponding to a location of the nozzles, the die body on the die face defining a first or outer generally annular land and a second or inner generally annular land having the nozzles disposed therebetween, the lands being annular in configuration and generally coplanar, the cutting plate being supported on the lands, a first clamp ring disposed external to the first land, the first clamp ring affixed to the die body forcing the cutting plate against the first land, a second clamp ring disposed within the first land, the second clamp ring being affixed to the die body, the second clamp ring forcing the cutting plate into engagement with the second land, the face of the cutting plate being generally coplanar with ends of the nozzles supported in the die body, a cutter rotatably supported generally on said axis adapted to work against the cutting plate.

Further features and advantages of the present invention will become more apparent from the specification taken in connection with the drawing wherein:

FIG. 1 schematically depicts a die face cutter in accordance with the invention;

FIG. 3A is an enlarged sectional view of the cutter of FIG. 3; and

Figure 1:
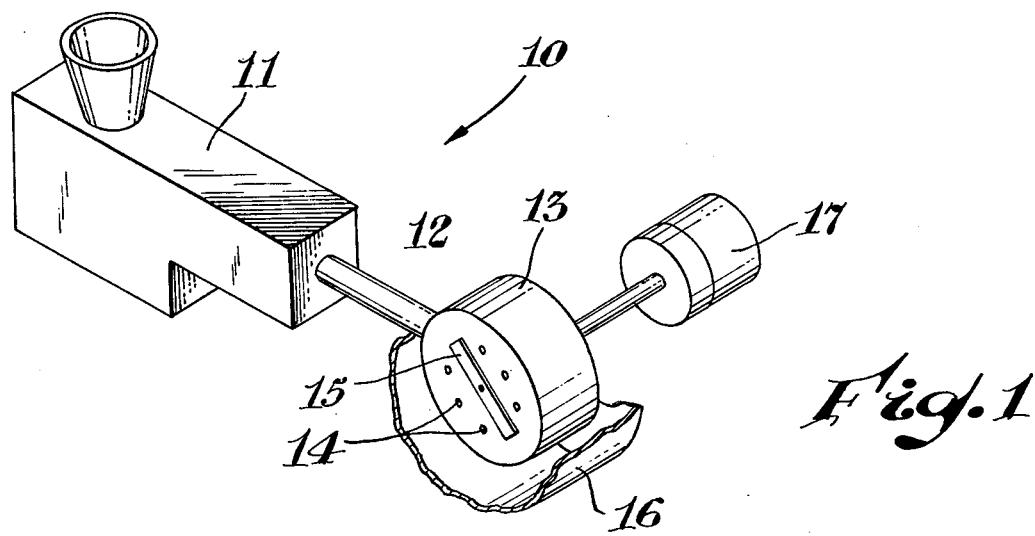

In FIG. 1 there is depicted a cutting assembly generally designated by the reference numeral 10. The cutting assembly 10 comprises in cooperative combination an extruder or source of heat-plastified thermoplastic material. A conduit 12 receives heat-plastified material from the extruder 11 and delivers it to a die face cutter assembly 13. The die of the die face cutter assembly 13 has a generally annular configuration and a plurality of extrusion openings 14 are arranged in a generally circular manner. A cutting blade assembly 15 is rotatably supported at about the center of the circle of the openings 14 and rotates adjacent the die severing material extruded therefrom into pellets which are thrown radially outward into a shroud or collector 16. The cutter blade assembly 15 is driven by a motor 17.

Figure 2:
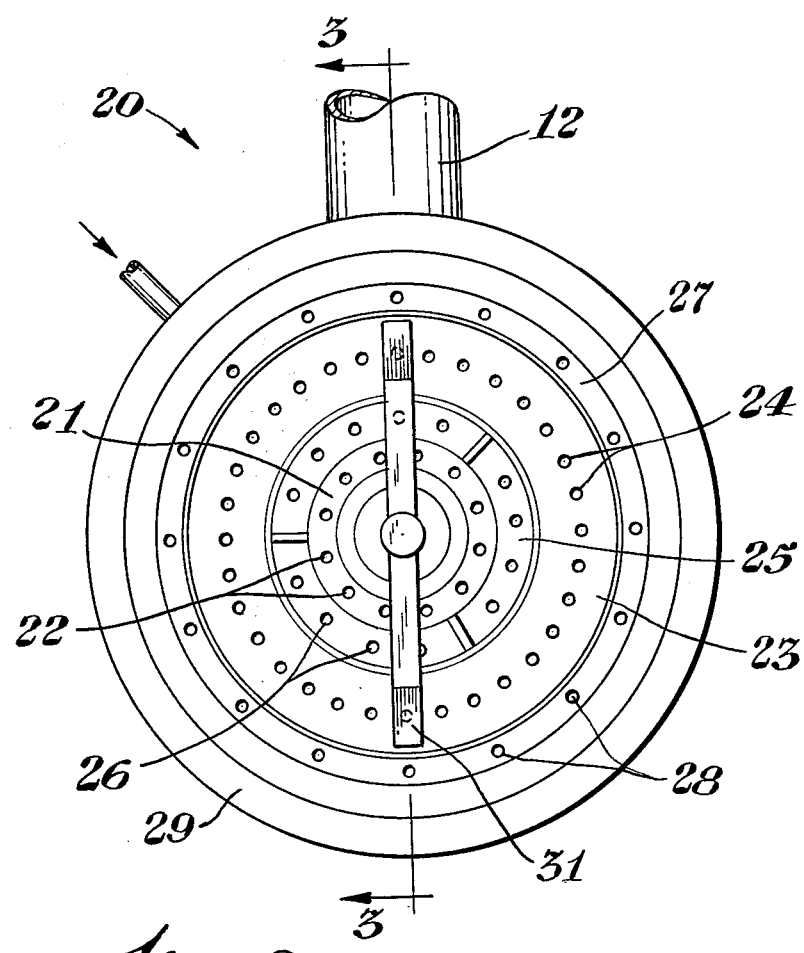
FIG. 2 is a schematic face view of a cutter in accordance with the invention.

In FIG. 2 there is depicted a face view of a die face cutting assembly generally indicated by the reference numeral 20. The die face cutting assembly 20 comprises a die body 21 of generally annular configuration. The die body 21 defines a plurality of apertures 22 therein extending in generally axial direction. The apertures 22 are employed to receive electric cartridge heaters to control the die body temperature. A cutting plate 23 is disposed on the face of the die body 21. The cutting plate 23 has a generally annular configuration and has a plurality of openings 24 generally circularly disposed therein. The openings 24 surround extrusion nozzles, not shown. A split three-piece clamp ring 25 is disposed within the cutting plate 23 and is affixed to the die body 21 by a plurality of axially extending bolts or cap screws 26. The clamp ring 25 forces the cutting plate 23 in a generally axial direction toward the face, not shown, of the die 21. An external one-piece clamp ring 27 surrounds the cutting plate 23 and is affixed thereto by means of a plurality of cap screws 28 which serve to clamp the external edge of the cutting plate 23 in a manner similar to the split ring 25. A water jacket 29 surrounds the outer clamp ring 27 and acts as a source of cooling for the cutter blade 23 by conduction and principally as a source of water spray through circumferentially located openings which provide cooling liquid to a shroud such as the shroud 16 of FIG. 1. The die 21 is in communication with heat-plastified thermoplastic material source 12a which is equivalent to conduit 12 of FIG. 1. The cutter assembly 31 is rotatable and axially supported within the die body such that the terminal portions of the assembly 31 may pass over the cutter blade and sever material extruded from the openings 24.

Figure 3:
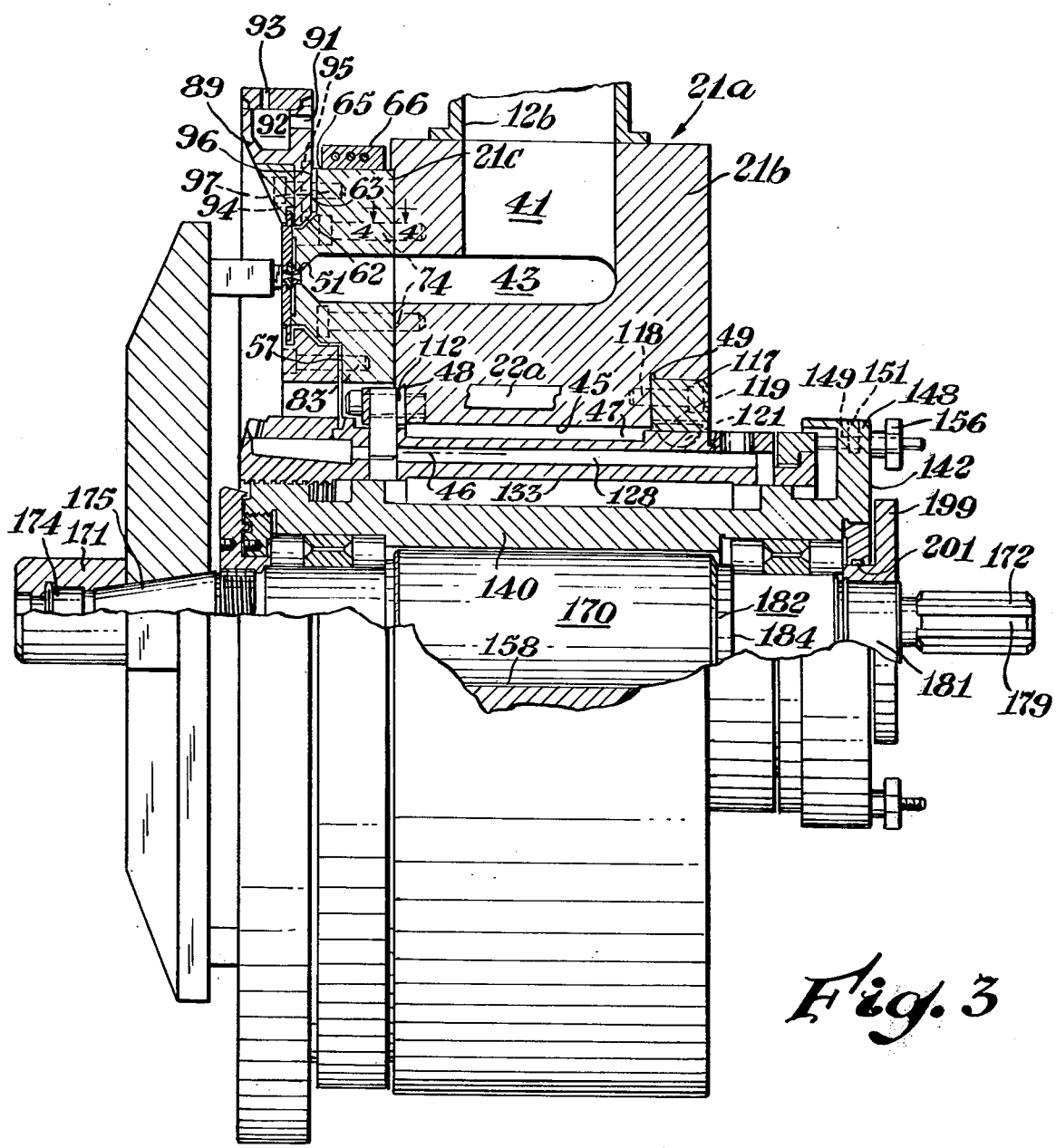
FIG. 3 is a sectional view of a cutter in accordance with the invention as taken along the line 3—3 of FIG. 2.

In FIG. 3 there is depicted a sectional view of a die face cutter such as the cutter of FIG. 2 and along the line 3—3 thereof. FIG. 3A is an enlargement of a portion of FIG. 3. The cutter assembly of FIGS. 3 and 3A is generally designated by the reference numeral 20a. The cutter assembly 20a comprises a die body 21a. The body 21a comprises a first or major portion 21b and a second or minor portion 21c, both portions being of generally annular configuration. The die body 21a defines a polymer inlet passage 41. The polymer inlet passage 41 is in operative combination with a source of heat-plastified synthetic resinous material 12b, external to the die body 21a. A generally annular polymer receiving plenum 43 is disposed within the die body 21a and is in operative communication with the polymer receiving passage 41. The die body 21a defines a plurality of cylindrical passages 22a extending entirely through body portion 21b. The passages 22a are generally parallel to the axis of generation of a generally cylindrical opening 45 within body portion 21b. The passage 45 has a first or extrusion end 46 and a second or drive end 47. Adjacent the passage 45 on the extrusion end 46, the body portion 21b defines an annular outwardly facing recess 48 while adjacent the drive end 47 of the body 21b defining a generally annular outwardly facing recess 49. The body portion 21c is in sealing relationship with body portion 21b. The body portion 21c remote from body 21b defines a plurality of circularly disposed extrusion or nozzle receiving apertures 51 which are equivalent to the apertures 24 of FIG. 1. The nozzle receiving apertures 51 are in full communication with the annular plenum 43. The body portion 21c defines a generally planar die face 52 remote from body portion 21b. Disposed on the die face 52 is a first or inner annular land 53 and a second or outer land 54. The land 53 is of circular configuration and lies within the circle of the openings 51. The second land 54 is external to the circle of the openings 51. The lands 53 and 54 terminate remote from body portion 21b in narrow flat faces which are generally coplanar. The die body 21 in a region within the land 53 defines a radially inward and axially outward annular recess 55. The recess 55 is defined by a first generally axially extending surface 56 and a second or generally radially extending surface 57 of the body portion 21c. Within the body portion 21c and in surface 57 are defined a plurality of grooves or keyways 58. The body portion 21c external to the second or outer land 54 defines a generally annular recess 61. The recess 61 is defined by a generally axially extending surface 62 and a generally radially extending surface 63. In the surface 63 are formed a plurality of radially extending grooves or keyways 65. An electrical band heater 66 is disposed about the outer circumference of body portion 21c. An annular cutting plate 68 is disposed adjacent the die face 52. The cutting plate is of annular configuration and defines a plurality of openings 69 which correspond to the openings 51 in the body portion 21c. The cutting plate 68 has a first or inner recess 69. The recess 69 is remote from body portion 21b. A similar external recess 71 is disposed about the outer periphery of the cutting plate 68. A plurality of extrusion nozzles 72 are disposed within the openings 51 of the die body portion 21c and opening 69 of the cutting plate 68. The nozzles 72 are affixed conveniently to the body portion 21c by means of brazing, welding or the like. The body portion 21c is maintained in fixed relationship to the body portion 21b by means of a plurality of cap screws 74. The cap screws 74 are generally axially extending. A first clamp ring 76 is disposed within the recess 55. The clamp ring 76 is a split ring in order to permit assembly. The ring 76 defines an outwardly facing annular groove 77 which receives an adjacent portion of the cutting plate 68 in the region of the recess 69. The clamp ring 76 remote from the recess 77 and adjacent the surface 57 defines a plurality of radially extending grooves 79. The clamp ring 76 is maintained in spaced relationship from the die body portion 21c by a plurality of keys 81 disposed in the keyways 58 and 79. A plurality of cap screws 83 urge the clamp ring in a direction generally toward recess 49 of the body portion 21b forcing the cutting plate 68 against adjacent land 53 of body portion 21c. Generally, adjacent face 52 of body portion 21c is an exterior or second annular clamp ring 85. The annular clamp ring has a radial cross-section configuration of a right triangle wherein the angle is directed radially outward and disposed generally adjacent body portion 21c. The clamp ring 85 defines a generally annular inwardly and axially facing recess 87. A portion of the cutting plate 68 is disposed within the recess 87. The clamp ring 85 rests upon and is surrounded by an annular water jacket 89. The water jacket has a water inlet 91 which is in full communication with an annular plenum 92 which in turn is in communication with a plurality of passages 93. The passages 93 are directed in a radially outward direction. The water jacket 89 defines an inwardly radially directed flange portion 94. The flange portion 94 has defined therein a plurality of radially disposed keyways 95. Within the keyways 95 and the adjacent keyways 65 within the body portion 21c are disposed keys or spacers 96. Thus, the outer annular clamp ring 85 rests upon the flange 94 of the water jacket 89 and both the clamp ring 85 and jacket 89 are affixed to the body portion 21c by means of a plurality of cap screws 97. A cutter assembly 100 is axially rotated relative to the cutter plate 68. The cutter assembly 100 comprises a blade holder 101 which supports cutting blades 102 which are adapted to pass over openings 72a of the nozzles 72 and sever the extruded material into pellets. Disposed primarily within the generally cylindrical cavity 45 within the die body 21a is a spindle assembly having a spindle housing carrier generally designated by the reference numeral 105. The spindle housing carrier has a first end 106 disposed generally adjacent to the cutting plate 68 and body portion 21c and a second end 107 disposed generally adjacent housing portion 21b but external to the cavity 45. The spindle housing carrier has a circular cross-sectional configuration of varying diameter. At a location adjacent the first end 106 the spindle housing carrier 105 defines four radially outwardly directed cylindrical openings 109. Partially disposed within passages 109 are hollow dowel members 110 which are a press fit in passages 109. Adjacent the passages 109 is disposed a mounting ring 112. The mounting ring 112 is partially disposed within the recess 48 of die body portion 21b and is rigidly affixed thereto by a plurality of cap screws 113. The cap screws 113 extend in a generally axial direction relative to passage 45 and the spindle housing 105. The ring 112 defines radially extending cylindrical openings 114. The openings 114 receive the portion of the hollow dowels 110 external to the spindle housing 105 with a tight sliding fit. The ring 112 has a diameter greater than the diameter of the adjacent portion of the spindle housing 105 and when the four close fitting dowels such as the dowels 110 are disposed at 90°, the spindle housing is rigidly affixed and centered within the cavity 45 and spaced from the adjacent portion of ring 112 in a manner such that heat transfer from body portion 21b to the spindle housing carrier 105 is minimized as is strain on the spindle housing on expansion of the ring 112. Generally adjacent the second end 107 of the spindle housing carrier 105 there are four equally circumferentially spaced lugs 115 disposed on the outer surface of the spindle housing carrier 105. Each of the lugs is slotted in an axial direction to form a keyway 116. A mounting ring 117 is affixed to housing portion 21b in recess 49 by a plurality of cap screws 118. The mounting ring 117 has four inwardly facing keyways 119 which correspond to the keyways 116 formed in the lugs 115 of the spindle housing cavity 105. Disposed within the keyways 119 and 116 are Woodruff keys 121. The inside diameter of ring 117 is greater than the adjacent cross-sectional diameter of spindle housing 105 including lugs 115. The key 121 serves to maintain the lugs 115 in spaced relationship from adjacent ring 117 to thereby minimize heat transfer from die body portion 21b to the spindle housing carrier 105 adjacent the second end 107 and maintain the carrier 105 centered at its second end 107. The spindle housing carrier 105 defines a first annular passage 123 adjacent second end 107. The annular passage 123 is in communication with a radially disposed cooling fluid inlet passage 124. Adjacent the first end 106 of the spindle housing assembly 105 is defined a second annular passage 125. A plurality of discharge outlets 127 are disposed adjacent first end 106 of the spindle housing cavity 105. The passages 127 extend generally radially outward and are positioned to direct cooling fluid such as water toward the cutter plate 68. A plurality of passages 128 are defined within the spindle housing carrier 105. The passages 128 extend in a generally axial direction relative to the spindle carrier and the annular die. Passages 128 beneficially are drilled holes radially spaced and provide communication between the annular passages 123 and 125. A generally annular outwardly directed groove 131 is disposed at the second end 107 of spindle housing carrier 105. The annular groove 131 is generally adjacent passage 124 and remotely disposed from lugs 115. The spindle housing carrier 105 defines a generally centrally disposed cavity 133 extending from the first end 106 to the second end 107. At the first end 106, the spindle housing cavity defines an internal threaded portion 135. The threaded portion 135 as depicted employs a screw thread which can take considerable axial thrust such as an Acme Screw thread. Disposed primarily within the passage 133 of the spindle housing cavity 105 is a spindle housing 140. The spindle housing 140 has a first end 141 and a second end 142. The spindle housing 140 has a generally elongate hollow configuration and is coaxially oriented relative to passage 45 of the die body 21a. The spindle housing at the first end 141 defines a plurality of external screw threads 144 which are in engagement with the screw threads 135 of spindle housing carrier 105. Generally adjacent to threads 144 and spaced therefrom are disposed four generally radially extending lugs 145. The lugs 145 engage an adjacent cylindrical surface of the cavity 133 of the spindle housing carrier 144. The lugs 145 are radially equally spaced at 90° to adjacent lugs. Generally adjacent the second end 142 of the spindle housing 141 are disposed a set of lugs 146 which are similarly arranged to the lugs 145. Four lugs 146 disposed at 90° and engage an adjacent cylindrical surface of the passage 133 within the spindle housing 105, thus, the spindle housing threadably engages the spindle housing carrier and is centered by means of lugs 145 and 146. At the second end 142 of the spindle housing 140 is a generally outwardly projecting flange 148. The flange 148 has defined therein a plurality of generally axially entending passages 149 and a plurality of radially extending passages 151. The passages 149 each have disposed therein threaded studs 152. The studs 152 are affixed to a split ring 154 disposed within groove or recess 131 of the spindle housing 105. A nut 156 threadably engages stud 152 adjacent to the flange 148 and remotely disposed from the split ring 154. On loosening the nuts 156, the spindle housing may be rotated by placing a pin in one or more of the openings 151 and exerting the appropriate force required to rotate the spindle housing 140 within the spindle housing carrier 105. When the desired positioning of the spindle housing 140 is obtained, tightening of the nuts 156 serves to prevent any further rotation of the spindle housing 140. The spindle housing 140 has defined therein an axially disposed passage 158. The passage 158 extends from the first end 141 to the second end 142 of the spindle housing 140. The passage 158 adjacent end 141 defines a region of maximum diameter 159 having internal screw threads 161. Adjacent the region 159 at first end 141, the passage 158 has region of intermediate diameter 162. The region of intermediate diameter terminates in a shoulder 163 which faces first end 141. Adjacent the second end 142 of spindle 140, the passageway 158 has a region of maximum diameter 165 which terminates in a shoulder 166. The shoulder 166 is generally normal to the axis of passage 158. Adjacent the region 165, the passage 158 has a region of inermediate diameter 167. Disposed within the passage 158 of the spindle housing 140 is a spindle 170. The spindle 170 has a first end 171 and a second end 172. The end 171 is generally adjacent but external to the first end 141 of the spindle housing 140. The second end 172 is external and adjacent to the second end 142 of the spindle housing 140. At the first end 171 of the spindle housing 170 is disposed an axially extending internally screw threaded cavity 174. A tapered region 175 tapers toward first end 171. Beneficially, the region 175 is a standard milling machine taper. Adjacent to the tapered region 175 is a generally cylindrical portion 176 of the spindle 170 having external screw threads thereon. The external threads are disposed partially within the spindle housing 140. Adjacent to the region 176 and remote from region 175 is a cylindrical bearing engaging region 177. Regions 174, 175, 176 and 177 are of increasing dimension in that order. Region 177 adjacent second end 172 and spindle 170 defines a bearing engaging shoulder 178. Spindle 170 at second end 172 terminates in an axially disposed spline 179. Adjacent to the spline 179 and of somewhat greater diameter is an externally threaded cylindrical portion 181. Adjacent the region 181 and remote from region 179 is a bearing engaging cylindrical portion 182 which is of greater diameter than region 181. Region 182 adjacent the first end 171 and remote from second end 172 forms a bearing engaging shoulder 184. A ball bearing 186 is disposed over region 177 of spindle 170 and engages shoulder 178. The ball bearing 186 is also disposed within region 162 of the spindle housing 140 and engages shoulder 163. A generally annular seal and bearing retainer 188 threadably engages the threads 161 of the spindle housing 140 and maintains the bearing 186 in engagement with the shoulder 163. Beneficially, the bearing 186 is one that is designed for both radial and thrust load. The retainer 188 on its inner face defines an inwardly facing annular groove 189 having disposed therein oil seal means 191. A sealing and deflector plate 192 of annular configuration threadably engages region 176 of the spindle 170. The seal and deflector plate 192 attached by threadable engagement with the spindle 176 is a generally cylindrical flange 194 extending toward and engaging the bearing 186 and also engaging a sealing means 191. Two concentric annular grooves 195 and 196 are defined by the deflector 192 in combination with corresponding lands on retainer 188 and spindle housing 140 from a labyrinth path which discourages, under operating conditions, the entry of water into the bearing 186. At the second end of spindle 170 is disposed a ball bearing 197 between region 182 of spindle 170 and region 162 of the spindle housing 140. The bearing 197 is required to take only radial load. An annular seal member 198 is disposed in threadable engagement with the spindle housing 140 in the recess 165. An annular bearing retainer 199 having a generally cylindrical seal portion 201 is threadably affixed to the spindle 170 at the region 181. The retainer 199 engages bearing 197 and forces it against shoulder 184.

The bearing 197 is capable of small axial movement within the spindle housing 140. Thus, in the event that the temperature of the spindle should change relative to that of the spindle housing, axial movement of the spindle will be primarily at second end 72 while first end of the spindle and spindle housing bearing 186 is rigidly clamped to both the spindle housing and the spindle. Axial motion of the cutter blades such as blades 102 will be small. By providing a calibrated scale on the flange 148, precise positioning and repositioning of the spindle is possible. Generally in the operation of cutters in accordance with the present invention, the cutting plate 68 receives satisfactory water supply through the spindle housing carrier. If additional water for cooling is required, auxiliary external sprays may be employed.

Figure 4:
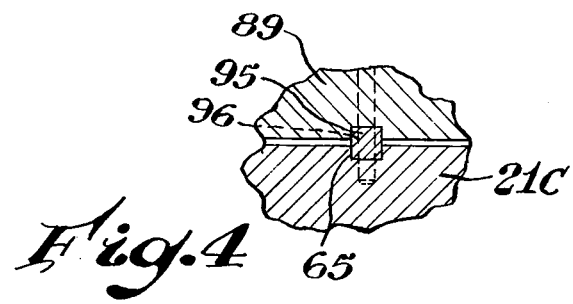
FIG. 4 is a fractional sectional view of the manner of mounting clamp rings and water jacket.

FIG. 4 is a fractional sectional view showing a portion of jacket 89 and a portion of body portion 21c having grooves or keyways 65 and 95 and key spacer 96 employed to space the jacket 89 from the die body 21.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A die face cutter assembly, the die face cutter assembly comprising in cooperative combination a generally annular extrusion die having an extrusion face of generally annular planar configuration, the die having a die body and a generally annular plenum therein having an axis of generation, the die body defining an entrance passageway, the entrance passageway being in communication with the plenum, the die body defining a plurality of extrusion passages in communication with the plenum, the extrusion passages extending generally perpendicular to the die face and each passage having a nozzle protruding therefrom, the nozzles each defining an extrusion nozzle passage therein in communication with the extrusion passages the nozzles being generally circularly arranged, a cutting plate having generally annular configuration and at least one generally planar cutting face, the cutting plate defining a plurality of passages therethrough, the passages each corresponding to a location of the nozzles, the die body on the die face defining a first or outer land and a second or inner land having the nozzles disposed therebetween, the lands being annular in configuration and generally coplanar, the cutting plate being supported on the lands, a first clamp ring disposed external to the first land, the first clamp ring affixed to the die body forcing the cutting plate against the first land, a second clamp ring disposed within the first land, the second clamp ring being affixed to the die body, the second clamp ring forcing the cutting plate into engagement with the second land, the face of the cutting plate being generally coplanar with ends of the nozzles supported in the die body, a cutter rotatably supported generally on said axis adapted to work against the cutting plate.

2. The cutting apparatus of claim 1 wherein a plurality of spacers are disposed between the clamp rings and the die body to provide reduced thermal conduction from the die body.

3. The cutting assembly of claim 1 including a spindle assembly disposed generally within the annular die body.

4. The apparatus of claim 3 wherein the spindle assembly has a first end disposed generally adjacent the die face and a second end disposed remote from the die face, the spindle housing assembly having a spindle housing carrier, the spindle housing carrier having a first end and a second end, the first and second ends of the spindle housing carrier being disposed adjacent first and second ends of the spindle assembly, the spindle housing carrier having a generally annular configuration and being supported at the first end thereof within the die housing by means of four dowels disposed generally at 90° to adjacent dowels, the dowels having their axes in a plane normal to the axis of the spindle housing assembly, a spindle housing disposed within the spindle housing carrier, the spindle housing having first and second ends adjacent to first and second ends of the spindle housing carrier, the spindle housing threadably engaging the spindle housing carrier adjacent the first end thereof, a spindle disposed within the spindle carrier, the spindle having first ends adjacent the spindle carrier first and second ends, a bearing disposed between the spindle housing and the spindle at the first end of the spindle and spindle housing which permits rotary motion of the spindle and prevents axial motion of the spindle, a second bearing between the spindle and spindle carrier, the second ends of the spindle housing carrier, spindle housing and spindle being free to move axially in the event of thermal expansion or contraction of any one or more of the spindle, spindle housing, or spindle housing carrier, means to selectively permit or prevent rotation of the spindle housing relative to the spindle housing carrier to permit selective axial positioning of the spindle.

5. The assembly of claim 4 wherein the spindle housing carrier has a cooling fluid inlet at the second end thereof and radially extending cooling fluid outlet at the first end thereof and an internal passage joining the inlets and outlets.

6. The assembly of claim 5 wherein the spindle housing carrier is supported in generally spaced relationship to the die body and the spindle housing is in generally spaced relationship to the spindle housing carrier.

7. A die face cutter assembly, the die face cutter assembly comprising in cooperative combination a generally annular extrusion die having an extrusion face of generally annular planar configuration, the die having a die body and a generally annular plenum therein having an axis of generation, the die body defining an entrance passageway, the entrance passageway being in communication with the plenum, the die body defining a plurality of extrusion passages in communication with the plenum, the extrusion passages extending generally perpendicular to the die face and each passage having a nozzle protruding therefrom, the nozzles each defining an extrusion nozzle passage therein in communication with the extrusion passages the nozzles being generally circularly arranged, a cutting plate having generally annular configuration and at least one generally planar cutting face, the cutting plate defining a plurality of passages therethrough, the passages each corresponding to a location of the nozzles, the die body on the die face defining a first or outer land and a second or inner land having the nozzles disposed therebetween, the lands being annular in configuration and generally coplanar, the cutting plate being supported on the lands, a first clamp ring disposed external to the first land, the first clamp ring affixed to the die body forcing the cutting plate against the first land, a second clamp ring disposed within the first land, the second clamp ring being affixed to the die body, the second clamp ring forcing the cutting plate into engagement with the second land, a plurality of spacers are disposed between the clamp rings and the die body to provide reduced thermal conduction from the die body, the face of the cutting plate being generally coplanar with ends of the nozzles supported in the die body, a cutter rotatably supported generally on said axis adapted to work against the cutting plate by a spindle assembly disposed generally within the annular die body, the spindle assembly having a first end disposed generally adjacent the die face and a second end disposed remote from the die face, the spindle housing assembly having a spindle housing carrier, the spindle housing carrier having a first end and a second end, the first and second ends of the spindle housing carrier being disposed adjacent first and second ends of the spindle assembly, the spindle housing carrier having a generally annular configuration and being supported at the first end thereof within the die housing by means of four dowels disposed generally at 90° to adjacent dowels, the dowels having their axes in a plane normal to the axis of the spindle housing assembly, a spindle housing disposed within the spindle housing carrier, the spindle housing having first and second ends adjacent to first and second ends of the spindle housing carrier, the spindle housing threadably engaging the spindle housing carrier adjacent the first end thereof, a spindle disposed within the spindle carrier, the spindle having first ends adjacent the spindle carrier first and second ends, a bearing disposed between the spindle housing and the spindle at the first end of the spindle and spindle housing which permits rotary motion of the spindle and prevents axial motion of the spindle, a second bearing between the spindle and spindle carrier, the second ends of the spindle housing carrier, spindle housing and spindle being free to move axially in the event of thermal expansion or contraction of any one or more of the spindle, spindle housing, or spindle housing carrier, means to selectively permit or prevent rotation of the spindle housing relative to the spindle housing carrier to permit selective axial positioning of the spindle and the spindle housing carrier is supported in generally spaced relationship to the die body and the spindle housing is in generally spaced relationship to the spindle housing carrier.

* * * * *